G. N. Stearns,
Hollow Auger.
N° 39,841.  Patented Sep. 8, 1863.
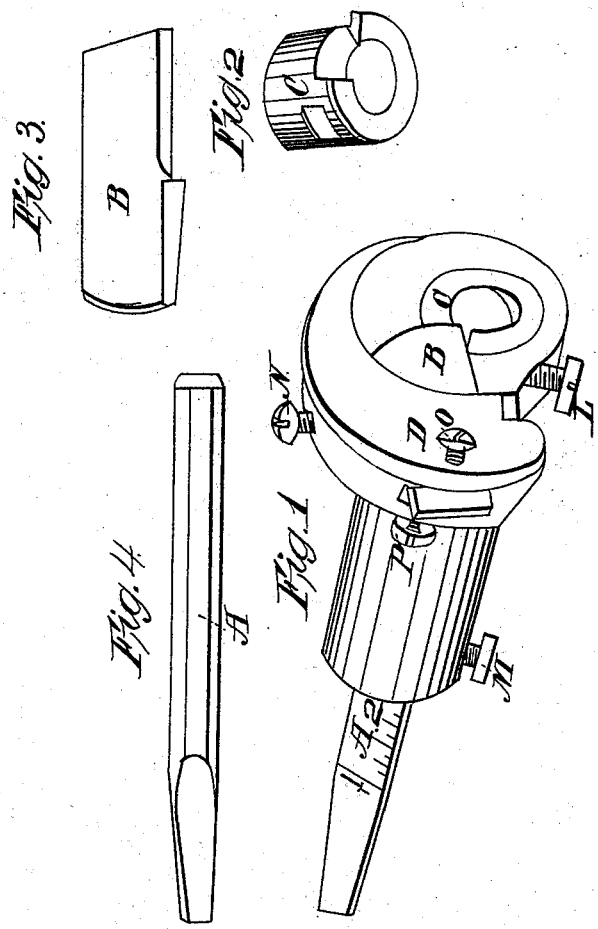
Witnesses.
William Wallace
Andrew J. Smith
Inventor.
George N. Stearns

UNITED STATES PATENT OFFICE.

GEORGE N. STEARNS, OF SYRACUSE, NEW YORK.

IMPROVEMENT IN HOLLOW AUGERS.

Specification forming part of Letters Patent No. 39,841, dated September 8, 1863; antedated January 16, 1863.

*To all whom it may concern:*

Be it known that I, GEORGE N. STEARNS, of Syracuse, county of Onondaga, State of New York, have invented certain new and useful Improvements in Hollow Augers; and I do hereby declare and ascertain the same, reference being had to the accompanying drawings, in which—

Figure 1 is a perspective view of my improvements combined in the form of an adjustable hollow auger. Fig. 2 is a view of one of the adjustable thimbles detached. Fig 3 is a detached view of the knife or cutter. Fig. 4 is a detached view of the adjustable shank.

Like letters refer to like parts in all the drawings.

I am aware that several attempts have been made to construct an adjustable hollow auger, but every such device that I have seen was either too expensive or too complicated or too inconvenient in practical use. I have found in my experience that there are three different ways in which this tool should be adjustable—viz., first, by means of thimbles, like C in Fig. 1, (held in place by set-screws L,) with different-sized internal apertures for different-sized tenons; second, by means of a movable knife or cutter, B, not only to conform to different-sized thimbles, but also so attached as to admit of a quick and convenient minute adjustment to the slight variations in the diameter of different bits made and intended for the same size, but which frequently differ perceptibly in the actual diameter of the hole which they bore; and a third, in the length of tenon which the auger will cut, which can be regulated by the adjustable shank A, which is set to any number of inches desired in the length of the tenon and held firmly in place by an ordinary set-screw, (marked M in Fig. 1.) In order to set the cutter B as firmly as heavy work requires and preserve sufficient strength in the body of the auger marked D, I find it necessary to cast this part of my device of strong material, like iron or brass, and with a mortise in which the said cutter is screwed by set-screws P, O, and N, Fig. 1, and in order to attain readily the minute adjustment of the cutter necessary to adapt the size of the tenon to the slight variations of bits intended to be of the same size, but which often vary slightly, I find a peculiar arrangement of the set-screw necessary—the set-screws P and O being near the outer end of the cutter and so as to act as a center of motion upon which the inner end of the cutter may be moved and adjusted in the most convenient and accurate manner by the set-screw N. This form of the body of the auger imparts great strength and lightness, and this arrangement of the set-screws therein secures the cutter firmly for the heaviest kind of work, and admits of a minute adjustment of the point of the cutter to the slightest variation in the size of the bit. I make the mortise through the body of the auger considerably wider than the thickness of the cutter, in order to permit a sidewise adjustment of the cutter to vary the thickness of chip or rapidity of cut, and I adjust this by means of the set-screws P and O, and by them hold the cutter in any position desired for this purpose. The set-screw N is also convenient for adjusting the point of the cutter to compensate for its wear in use, and to vary its point laterally for the minute adjustment above described, and for this purpose, and also to obtain a drawing cut, I locate my cutter so that its edge will stand at an angle of about forty-five degrees from a line extending from its point to the center of the thimble. By this means a drawing cut is obtained and also a very convenient lateral adjustment of the point of the cutter.

Having thus fully described my invention, what I claim therein as new, and desire to secure by Letters Patent, is—

1. The construction of the body of the auger, substantially as described, and combining therewith the adjustable thimble C, the adjustable cutter B, and the adjustable shank A, for the purposes substantially as specified.

2. Confining the cutter within the mortise and sustaining and locating it so as to obtain the longitudinal, vertical, and lateral adjustment, and the drawing cut, substantially as and for the purposes described.

GEO. N. STEARNS.

Witnesses:
WILLIAM WALLACE,
ANDREW J. SMITH.